Figure 5:
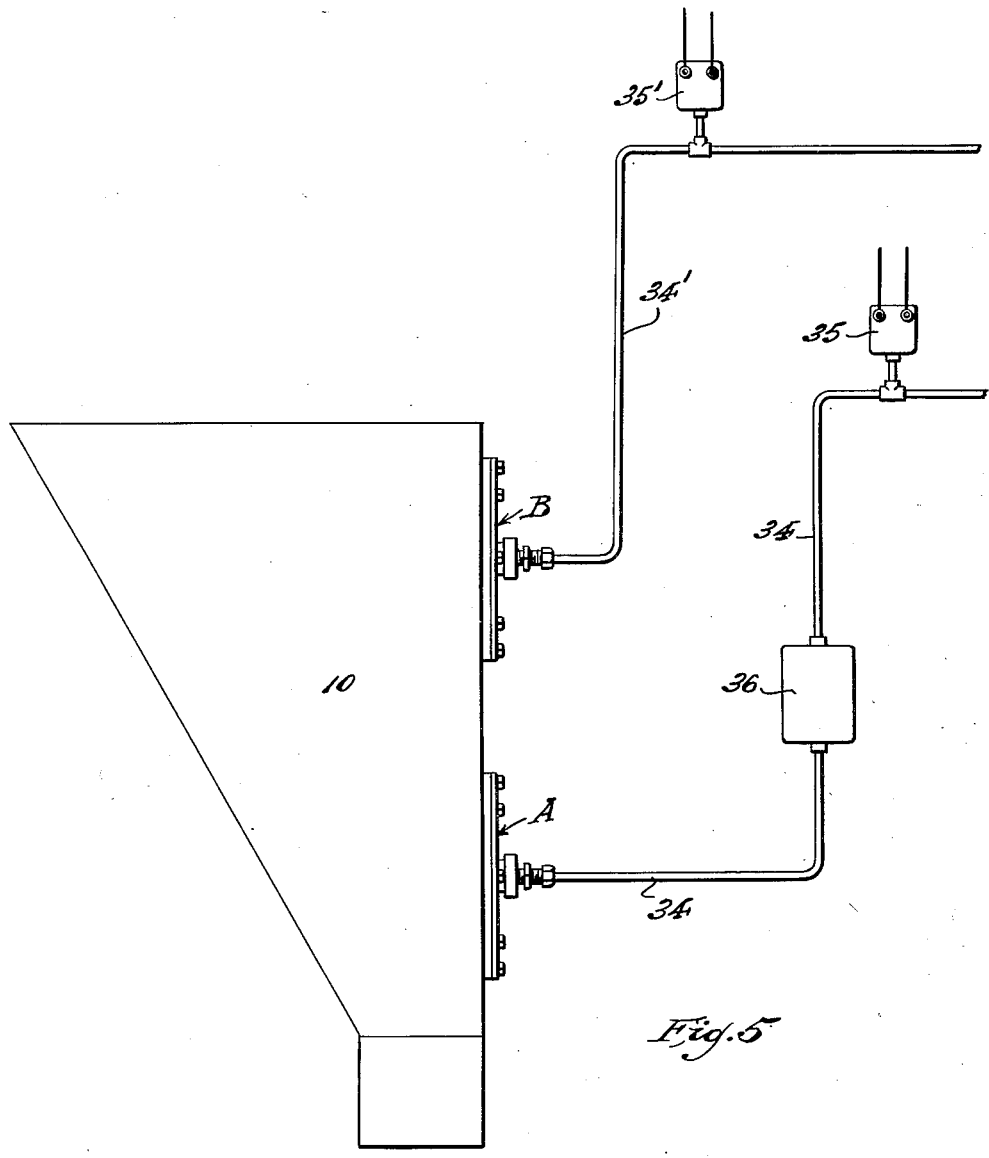

March 31, 1953 E. E. FIELDS ET AL 2,633,509
MATERIAL LEVEL CONTROL MEANS FOR FEED HOPPERS
Filed Nov. 10, 1951 3 Sheets-Sheet 1
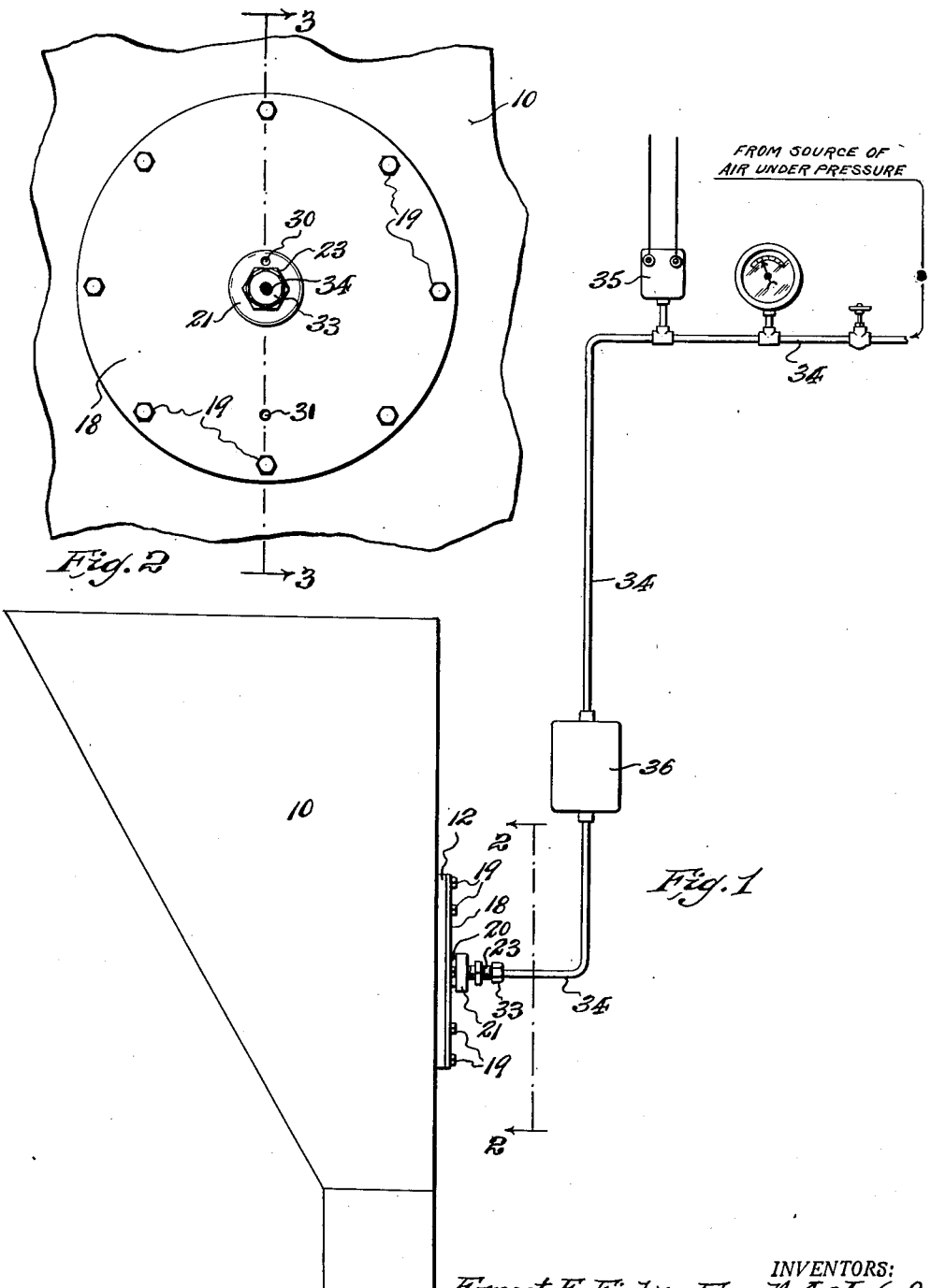

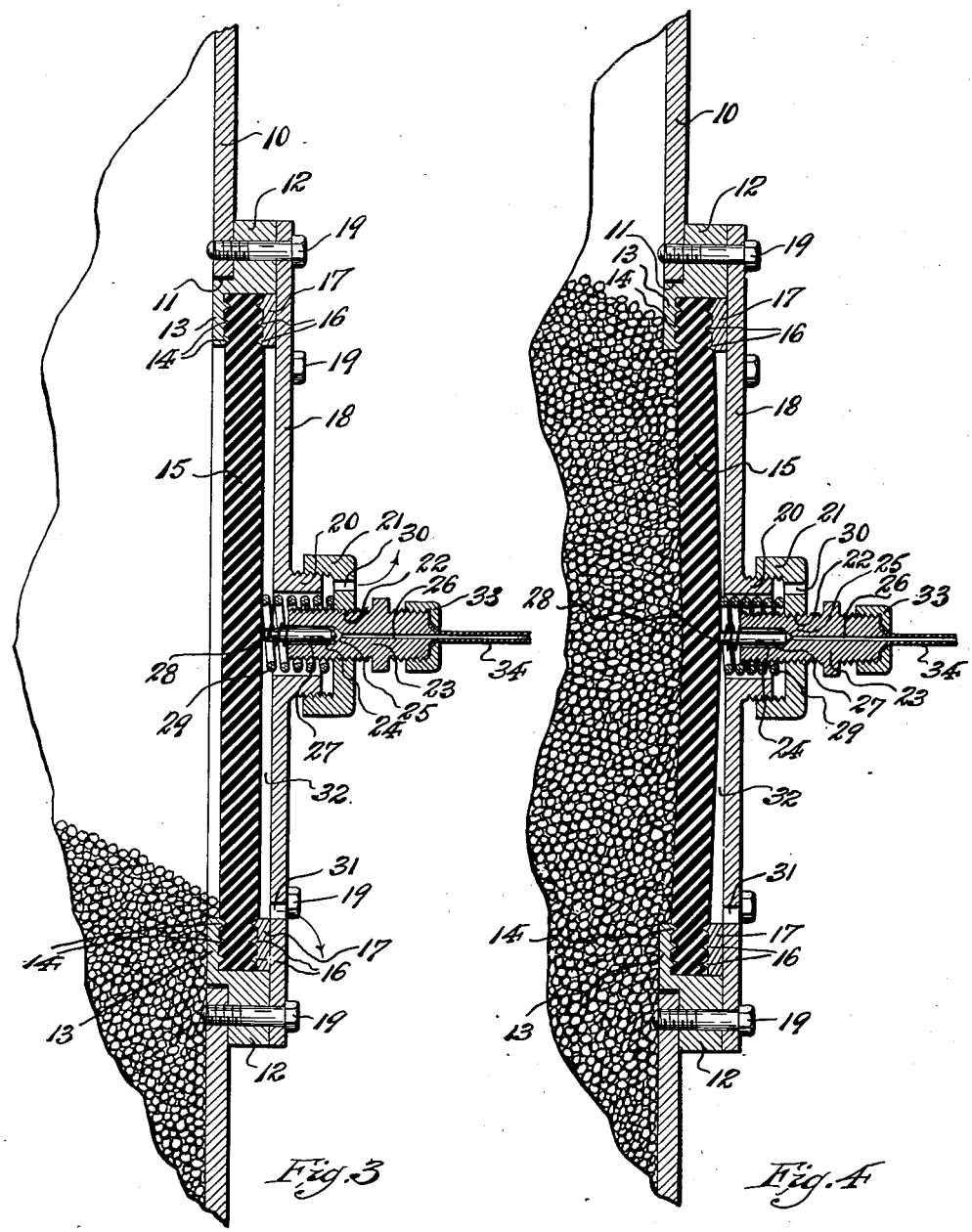

Patented Mar. 31, 1953

2,633,509

UNITED STATES PATENT OFFICE 2,633,509

MATERIAL LEVEL CONTROL MEANS FOR FEED HOPPERS

Ernest E. Fields, Newark, Frank A. Jova, Kearny, and Frank P. Librizzi, Union, N. J.

Application November 10, 1951, Serial No. 255,842

4 Claims. (Cl. 200—52)

This invention relates to improved means for controlling level of material in a hopper or bin from which the material gravitates to a place of use.

The invention has for an object to provide in connection with a hopper or bin used to feed material, especially discrete material such as coal, sand, grain, crushed stone, ores or the like, to a place of use, improved means for maintaining a desired level of the material within the hopper or bin either automatically by controlling means by which service of replenishment material to the hopper or bin is accomplished, or by actuating signal means indicative of need for service of replenishment material to the hopper or bin when level of the material therein becomes dangerously low or discontinuance of such service when the level becomes dangerously high, so that an adequate volume of the material can be constantly maintained within the hopper or bin.

The invention has for a specific object to provide, in combination with a wall of a hopper or bin, diaphragm controlled valve means, which is responsive to pressure of material within the hopper or bin, whereby to govern transmission of a pressure fluid to electrical switch means adapted to be actuated by variation of the fluid pressure for opening and closing an electric circuit by which mechanism operative to supply replenishing material to the hopper or bin is controlled, or to operate visible or audible signal means indicative of material level conditions within the hopper or bin, or both.

Other objects of this invention will be understood upon reading the following description of illustrative embodiments of the invention in connection with the accompanying drawings, in which:

Fig. 1 is an elevational view of a hopper equipped with one form and arrangement of material level control means according to this invention; and Fig. 2 is a fragmentary sectional view, taken on line 2—2 in Fig. 1, but drawn on an enlarged scale.

Fig. 3 is a vertical longitudinal sectional view, taken on line 3—3 in Fig. 2, but drawn on a further enlarged scale, said view showing the diaphragm controlled valve open to relieve pressure in the pressure fluid line which controls a pressure responsive electric switch means; and Fig. 4 is a similar view, showing the diaphragm controlled valve closed by pressure of the hopper content upon the diaphragm, whereby to render pressure in the pressure fluid line effective upon the pressure responsive electric switch means.

Fig. 5 is an elevational view similar to that of Fig. 1, but showing a modified arrangement wherein the hopper is equipped with low and high level responsive diaphragm controlled valves to respectively control electric circuits for starting and stopping means for serving replenishing material to the hopper.

Similar characters of reference are employed in the above described views, to indicate corresponding parts.

Referring to the drawings, more particularly to Figs. 1 to 4 inclusive thereof, the reference character 10 indicates a hopper which is equipped with material level control means according to this invention. A wall of the hopper 10, which may be either its inclined wall or its perpendicular wall, but preferably the latter as shown, is provided with an opening 11 suitably located intermediate its open top and its bottom discharge end, substantially in the plane of a desired minimum level below which material in the hopper is not desired to fall. Engaged with marginal portions of the wall opening 11 is an annular frame or ring 12. This frame or ring 12 is provided, in internal extension from its inner periphery, with a seating flange 13 which is entered in the wall opening and which is provided on its inner face with gripping teeth 14. Seated against the flange 13 is a flexible diaphragm member 15, the inner face of which is exposed to the interior of the hopper 10. The inner face marginal portions of said diaphragm 15 are gripped by the teeth 14 of the seating flange 13. The outer face marginal portions of said diaphragm member 15 are gripped by the teeth 16 of a clamp ring 17 which is inserted within the frame or ring 12. Applied across the outer face of the frame or ring 12 is a backing plate 18 which retains the clamp ring 17 in gripping relation to the diaphragm member 15. The assembly of frame or ring 12, diaphragm member 15, clamping ring 17 and backing plate 18 is affixed to the hopper wall by suitable fastening means, such as bolts 19, thus operatively supporting the diaphragm member 15 subject to engagement by the material content of the hopper 10 and to outwardly flexing pressure exerted thereon by said material content.

Formed in connection with the backing plate 18, in alignment with the center or axis of the diaphragm member 15, is an outwardly projecting, externally screw-threaded, tubular throat portion 20. Threaded onto the free end of this throat portion 20 is a closure member or cap 21 having an internally screw-threaded axial opening 22 in its end wall. Threaded through the opening 22 of the closure member or cap 21, for axial extension into the interior of the throat portion 20, is a valve housing member 23. This valve housing member 23 is provided with a valve chamber 24 which enters into its inner end, and which terminates in a valve seat 25. The valve seat 25 surrounds a pressure fluid passage 26 which leads to the valve chamber 24 from the outer end of the valve housing member. Movably supported within the valve chamber 24 is a valve member 27, the conical inner end portion of which cooperates with the valve seat 25. The exterior end of the valve member 27 is opposed to the diaphragm member 15. Said valve member 27 is yieldably urged to normal open position by a compression spring 28 which is connected between its exterior end and the inner end of the valve housing member 23. A compression spring 29 is arranged between the end wall of the closure member or cap 21 and the outer face of the diaphragm member 15, and is operative to inwardly flex the diaphragm member so as to relieve closing thrust upon the valve member 27 when said diaphragm member is relieved from outthrusting pressure of material within the hopper 10. The closure member or cap 21 is provided with a vent opening 30 leading outwardly from the interior of the throat portion 20. Likewise, the backing plate 18 is provided with a vent opening 31 leading outwardly from the space 32 between the backing plate and the diaphragm member, which space 32 is in communication with the interior of the throat portion 20.

Connected by a suitable union or coupling 33 to the outer end of the valve housing member 23, to communicate with the pressure fluid passage 26 of the latter, is a conduit 34 through which is served a fluid under pressure, such as compressed air, from a source thereof to the diaphragm controlled valve 27. Connected in communication with the pressure fluid conduit or line 34 is a pressure responsive electrical switch 35. Said switch is optionally adapted to control the circuit of electrically actuated means for timing the operation of mechanism (not shown) by which replenishment material is served to the hopper 10, or to control the circuit of electrical audible or visible signal means (not shown) used to indicate material level conditions within the hopper 10.

A pressure fluid volume chamber 36 of suitable capacity is preferably provided for connection in the conduit or line 34 intermediate the switch 35 and the diaphragm controlled valve 27.

In an embodiment of the invention such as shown in Fig. 1, wherein but one diaphragm controlled valve 27 is employed in connection with the hopper 10, assuming that the switch 35 is of a self-closing type adapted to be held in open or circuit interrupting condition by transmission thereto of pressure of the fluid in the conduit or line 34, the operation is as follows:

Assuming that the level of discrete material in the hopper 10 has fallen below the diaphragm 15, thus displacing the material relative to the latter so that no out-thrusting pressure of said material is exerted against the same, then said diaphragm will assume a normal, substantially non-flexed position, its movement to such position being assured by the inward thrust of the spring 29 (see Fig. 3). Under these conditions, the diaphragm 15 is withdrawn from the opposed end of the valve member 27, so that the spring 28 associated with the latter moves the same outwardly in the valve chamber 24, and away from the valve seat 25, thereby opening communication between the valve chamber 24 and pressure fluid passage 26 and conduit or line 34. Under these circumstances, the pressure fluid in the conduit or line 34 leaks away past the open valve member 27 through the valve chamber 24 and throat portion 20, venting to the atmosphere through the vent opening 30 of the closure member or cap 21, and also through the vent opening 31 in the backing plate 18 via the space 32 between the latter and the diaphragm. Such venting of the fluid effects a reduction or drop in the pressure thereof within the conduit or line 34, so that the pressure is substantially reduced below normal, and consequently pressure of the fluid which is effective upon the switch 35 is likewise so reduced as to no longer resist self-closing action of said switch, whereupon the switch closes and completes the electrical circuit by which material replenishment mechanism is put in operation to refill hopper 10, or to operate an audible or visible signal indicative of necessity for material replenishment, as the case may be.

When replenishing material is served to the hopper 10 and the latter is filled so that the diaphragm 15 is covered thereby, and thus subjected to out-thrusting pressure of the weight of material against the same, said diaphragm will be outwardly flexed (see Fig. 4). Outward flexing movement of the diaphragm 15 will engage the same with the opposed end of the valve member 27, thereby moving the latter inwardly through the valve chamber 24 against the tension of its spring 28, until said valve member engages the valve seat 25, and thus closes the pressure fluid pasasge 26 against escape of fluid from the conduit or line 34. Under these conditions, the pressure of the fluid in the conduit or line 34 rises to the normal initial selected pressure at which the fluid is served from the source thereof. When such normal initial pressure is restored in the conduit or line 34, the fluid pressure will again become effective upon the switch 35 so as to open and hold open the same against its self-closing action. When the switch 35 is thus opened and held open, the electrical circuit controlled thereby will be interrupted to stop operation of the material replenishment mechanism, or to discontinue operation of audible or visible signal means, as the case may be.

The above operations will be automatically repeated in accordance with fall and rise of material level within the hopper 10.

It will be noticed that two vent openings 30 and 31 the preferably provided for venting the pressure fluid which passes the open valve member 27. The provision of the two vent openings is desirable since it prevents trapping of the pressure fluid against the exterior face of the diaphragm 15 with risk of untimely operation of switch 35, in the event tampering closure of a single vent opening by application thereto of a finger should occur.

The diaphragm controlled valve means is capable of easy adjustment for regulating its sensitivity and to accommodate its action as may be required by the size of the hopper, weight and consistency of material moving through the hopper, and for timing the effect thrust of the diaphragm 15 against the valve member 27. Such adjustments can be made by adjusting the position of the valve housing member 23 relative to the closure member or cap 21, whereby to desirably space the opposed end of the valve member 27, when said valve member is in open condition, relative to the diaphragm 15, adjusting the tension of the diaphragm return spring 29 by turning the closure member or cap in or out on the throat portion 20, or by both of these adjusting operations.

As above mentioned it is preferable to provide a pressure fluid volume chamber 36 in the conduit or line 34 between the switch 35 and diaphragm controlled valve 27, whereby to prevent too sudden a reduction of pressure at the switch 35 upon opening of the valve member 27. The extra volume of pressure fluid stored in said volume chamber takes time to leak off through the open valve, and consequently reduction of fluid pressure at the switch 35 sufficient to permit operation of the latter is retarded, so that false or premature starting of the material replenishment mechanism is prevented. This is of special advantage in the event, due to a sudden discharge of material from the hopper, a temporary displacement of the material within the hopper from its normal angle of repose should occur and result in momentary withdrawal of material thrust against the diaphragm member before the material reaches the low level at which replenishment is desired to be started.

It will be observed that the back plate 18 not only supports the valve means, but also serves as a stop for limiting outward flexing movement of the diaphragm 15, thus preventing application of undue stretching stress thereto, while at the same time preventing spillage of material from the hopper should the diaphragm be accidentally ruptured.

In the hopper installation as above described but one diaphragm controlled valve means is provided, and this arrangement will serve the intended purposes satisfactorily, especially in connection with hoppers of comparatively small capacity. For hoppers of comparatively large capacity it is desirable to utilize two diaphragm controlled valve means, one operative at a low material level and the other at a high material level, whereby to control level of the material in the hopper between selected low and high level points. An installation of the latter kind is shown in Fig. 5, wherein the hopper 10 is provided with a low level diaphragm controlled valve means A and a high level diaphragm controlled valve means B, each of the same corresponding in detail structure, parts and arrangement to that hereinabove already described. To the low level diaphragm controlled valve means A is connected a pressure fluid conduit or line 34 which serves a pressure responsive switch 35 that communicates therewith. Said conduit or line 34 includes a volume chamber 36 between said switch 35 and the diaphragm controlled valve means A. To the high level diaphragm controlled valve means B is connected a pressure fluid line 34' which serves a pressure responsive switch 35'. In this arrangement, the switch 35, as controlled by the low level diaphragm controlled valve means A, can be utilized to start material replenishment mechanism when material drops to the selected low level within the hopper 10, and the switch 35', as controlled by the diaphragm controlled valve means B, can be utilized to stop the material replenishment mechanism when material rises in the hopper 10 to the selected high level.

In practice, pressure of fluid supplied to the conduits or lines and to the diaphragm controlled valve means is selected according to that best adapted for operation of pressure responsive switch or switches employed.

Having now described our invention, we claim:

1. Material level control means for a feed hopper comprising a frame mounted around an opening in a wall of the hopper, a flexible diaphragm secured by the frame across said hopper wall opening subject to out-thrusting pressure of material contained in the hopper, a backing plate secured to and across the exterior of said frame in outwardly spaced parallel relation to the exterior face of the diaphragm, said backing plate having an externally screw-threaded outwardly projecting tubular throat portion axially aligned with the diaphragm, an adjustable cap threaded on said throat portion, compression spring means between said cap and the diaphragm to exert in-thrusting pressure upon the latter, means to provide a fluid escape passage supported by said cap and having a movable valve member to open and close said passage, a conduit adapted to be supplied with a pressure fluid connected in communication with said passage, an electrical switch means in communication with said conduit and responsive to variation of fluid pressure in the latter, said valve member being adapted to be moved by outward flexing of the diaphragm whereby to close said passage against escape of pressure fluid from the conduit and thus maintain pressure in said conduit and switch means, said valve member being movable to open said passage for escape of pressure fluid from the conduit upon retraction of the outwardly flexed diaphragm and thereby to reduce pressure in said conduit and switch means, and means to vent escaping pressure fluid from the space intermediate the diaphragm and backing plate.

2. Material level control means for a hopper according to claim 1 including a volume chamber connected in the line of the conduit between the switch means and the valved escape passage.

3. Material level control means for a feed hopper comprising a frame mounted around an opening in a wall of the hopper, a flexible diaphragm secured by the frame across said hopper wall opening subject to out-thrusting pressure of material contained in the hopper, a backing plate secured to and across the exterior of said frame in outwardly spaced parallel relation to the exterior face of the diaphragm, said backing plate having an externally screw-threaded outwardly projecting tubular throat portion axially aligned with the diaphragm, an adjustable cap threaded on said throat portion, compression spring means between said cap and diaphragm to exert in-thrusting pressure upon the latter, a valve housing member adjustably supported by and extending through said cap and provided with a fluid escape passage, a movable valve member carried by the inner end portion of the housing member with an end thereof opposed to the exterior face of the diaphragm, a conduit adapted to be supplied with a pressure fluid connected in communication with the fluid escape passage of the housing member, an electrical switch means in communication with said conduit and responsive to variation of pressure in the latter, said valve member being adapted to be moved by outward flexing of the diaphragm whereby to close the fluid escape passage and thus maintain pressure in said conduit and switch means, means to yieldably urge said valve member to fluid escape passage opening position upon retraction of the outwardly flexed diaphragm and thus to reduce pressure in said conduit and switch means, and means to vent escaping pressure fluid from the space intermediate the diaphragm and backing plate.

4. Material level control means for a hopper according to claim 3 including a volume chamber connected in the line of the conduit between the switch means and the valve housing member.

ERNEST E. FIELDS.
FRANK A. JOVA.
FRANK P. LIBRIZZI.

REFERENCES CITED

The following references are of record in the file of this patent:

UNITED STATES PATENTS

| Number | Name | Date |
|---|---|---|
| 1,769,910 | Ponsonby et al. | July 1, 1930 |
| 1,977,228 | Carter | Oct. 16, 1934 |
| 2,318,355 | Bailey | May 4, 1943 |
| 2,331,208 | Ludi | Oct. 5, 1943 |